United States Patent [19]

Miller

[11] 3,710,123

[45] Jan. 9, 1973

[54] PNEUMATIC PULSE COUNTER

[75] Inventor: Robert C. Miller, Frederic Polk, Wis.

[73] Assignee: Honeywell Inc., Minneapolis, Minn.

[22] Filed: Feb. 16, 1971

[21] Appl. No.: 115,462

[52] U.S. Cl. ...........235/201 ME, 235/91 F, 235/132

[51] Int. Cl. ...............................................G06m 1/00

[58] Field of Search .......................235/91 F, 132, 201

[56] References Cited

UNITED STATES PATENTS

| | | |
|---|---|---|
| 3,489,175 | 1/1970 | Loveless et al. ..................235/132 X |
| 2,969,042 | 1/1961 | Litz et al. ....................235/201 ME X |
| 3,371,863 | 3/1968 | Bickford et al. .......................235/201 |

*Primary Examiner*—Richard B. Wilkinson
*Assistant Examiner*—Lawrence R. Franklin
*Attorney*—Charles J. Ungemach and Albin Medved

[57] ABSTRACT

A pneumatic pulse counter in which a moveable count shaft is responsive to a pneumatic input signal at a first input port thereby providing, by means of a count pawl, a predetermined movement to a memory shaft. The final position of the memory shaft is frictionally retained by a retaining pawl while the count shaft returns to its initial position ready to respond to another input signal. A third shaft is provided responsive to a pneumatic input at a second input port to contact the retaining and count pawls thereby allowing the memory shaft to return to its initial position. Upon a total predetermined movement of the memory shaft, without the occurrence of an input at the second input port, an output signal is provided.

1 Claim, 4 Drawing Figures

PATENTED JAN 9 1973 3,710,123

INVENTOR.
ROBERT C. MILLER

BY [signature]

ATTORNEY

PNEUMATIC PULSE COUNTER

BACKGROUND OF THE INVENTION

1. Field of the Invention

This invention relates generally to counters and more particularly concerns mechanical counters responsive to a pneumatic input.

2. Description of the Prior Art

In the prior art counters have served a very useful function and tend to be well-known. Some sophisticated counters employ purely electronic equipment. These systems tend to be troublesome since they must be noise suppressed.

The electro-mechanical counters are also rather well-known. The most common counter of this type is the stepping relay where when a relay pulses in response to an electrical input, it pulls an arm, which is free to move in a circle, to another contact point which is located upon a board at the periphery of the arm path.

Digital read-out counters responsive to pneumatic pulses are known in the art. But these counters do not have a reset capability and are unable to produce any useful work in response to a particular series of events.

BRIEF SUMMARY OF THE INVENTION

In accordance with the invention, a resetable pneumatic pulse counter is provided for counting the number of first type input pulses. The counter provides an output signal upon the occurrence of a particular number of first type input pulses, provided it is not interrupted by the occurrence of a second type input pulse.

The counter has as its essential elements three shafts, a count pawl, and a retaining pawl, all of which are located within a housing.

The first shaft receives the input count pulse and upon input begins movement. The total movement of the first shaft is limited also by a count adjustment screw. The motion of the first shaft is limited also by a compression spring. The count pawl is slotably attached to the first shaft by means of a slot at one end where located within the slot is a pin which is attached to the first shaft. The count pawl is spring-urged and has located at its other end a hole through which hole the second shaft is received.

With this arrangement, as the first shaft moves in response to an input pulse, the count pawl, frictionally engages the second shaft and moves the second shaft a predetermined distance. The second shaft is spring-urged in a direction opposite to the movement of it by the count pawl. The second shaft, after being moved a predetermined distance, which distance is effectively adjusted by the count adjustment screw, will be retained by the retaining pawl. The retaining pawl is similar to the count pawl but is slotably attached to the housing. After experiencing the input, the first shaft is spring-urged back to its initial position. Then, when a second input pulse is received at the first shaft, its movement, once again with the aid of the count pawl, moves the second shaft another predetermined distance. And once again, the retainer pawl retains the second shaft in the new position.

This combination of shaft and retainers comprise a pneumatic pulse counter whereby by adjusting the count adjustment screw, thus limiting the motion of the first shaft, the total movement of the second shaft can be limited in response to a single pulse. A meaningful output can be derived from this mechanism by providing that in response to a predetermined total movement of the second shaft, which movement of course would be due to the discrete number of pulses of the first shaft, a control orifice or similar device could be manipulated to generate an output.

A third shaft is provided which shaft has two bosses thereon. This shaft is responsive to a second input pulse in which event the two bosses move the retaining pawl and the count pawl, thus disengaging the frictional engagement existing between the pawls and the second shaft and allowing the second shaft to return to its initial position.

Accordingly, an object of the present invention is to provide a pneumatic pulse counter which provides an output signal upon the occurrence of a particular predetermined number of first type input pulses, provided it is not interrupted by the occurrence of a single second type input pulse.

Various other objects, advantages, and features of novelty which characterize my invention are pointed out with particularity in the claims annexed hereto and forming a part hereof. However, for a better understanding of the invention, its advantages and objects obtained by its use, reference should be had to the drawings which form a further part hereof and to the accompanying descriptive matter in which there is illustrated and described a certain preferred embodiment of the invention.

DESCRIPTION OF THE PREFERRED EMBODIMENT

Figure 1:
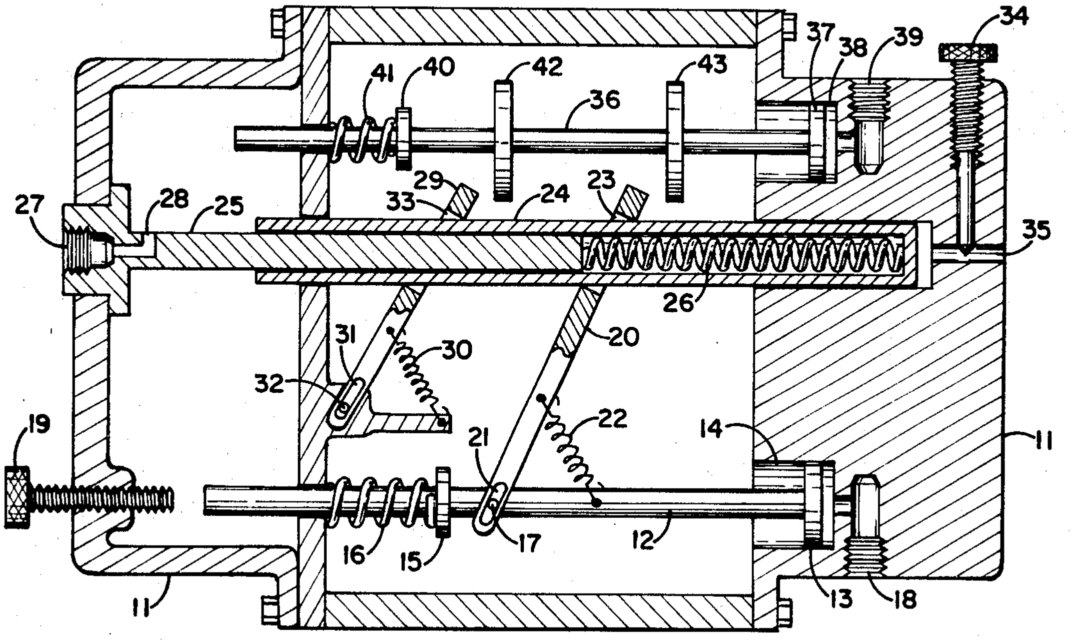
FIG. 1 is a cut-away view of a first embodiment of the invention.

Referring now to FIG. 1 of the drawings, a preferred embodiment is shown. A housing 11 houses a count shaft 12. Shaft 12 has a piston end 13 which travels within bore 14 of housing 11. Shaft 12 also has a flange 15 which has located between it and housing 11 a compression spring 16. Shaft 12 also has a pin 17. A count pulse port 18 is located within the housing 11 which port is capable of receiving a pneumatic pulse in order to drive the piston ended shaft 12 in a first direction to the left on the drawing. A count adjustment screw 19 is provided to limit the total movement of shaft 12.

Slotably attached to shaft 12 is a count pawl 20. Count pawl 20 can also be seen in FIG. 2. It has a slot 21 within which pin 17 of shaft 12 is free to move. Count pawl 20 is spring-urged by a spring 22 attached to shaft 12. Located at the upper end of count pawl 20 is hole 23.

Located within hole 23 of pawl 20 and free to move therethrough is a memory shaft 24. Shaft 24 is hollow and moveable upon a shaft 25 and spring-urged away from the end of shaft 25 by a compression spring 26. Memory shaft 24 is guided within housing 11. A control port 27 and a control orifice 28 are located at the opposite end of shaft 25.

Figure 2:
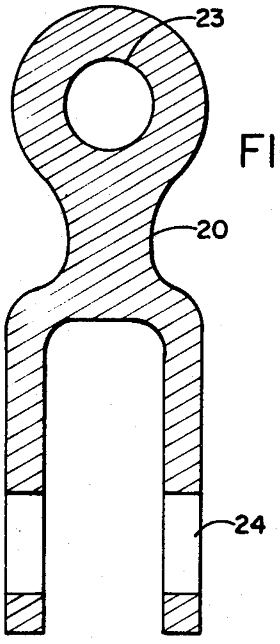
FIG. 2 is a front view of a pawl.

Also attached to housing 11 is a retainer pawl 29. Retainer pawl 29 is structurally similar to count pawl 20, as shown in FIG. 2. Retainer pawl 29 is spring-urged by a spring 30 which is attached to housing 11. Pawl 29 has a slot 31 in which rides a pin 32 which is attached to housing 11. At the upper end of pawl 29 is a hole 33 through which extends memory shaft 24.

Within housing 11 is also a dashpot control screw 34 which when screwed will control a dashpot vent 35.

A reset shaft 36, having a piston end 37, is provided. Shaft 36 is guided by housing 11 at one end and by a bore 38 of housing 11 at the other end. Within housing 11 is a reset pulse port 39 open to bore 38. Reset shaft 36 has a flange 40 which has located between it and housing 11 a spring 41 which urges shaft 36 in a direction to the right on the drawing. Reset shaft 36 also has located on it a boss 42 and a boss 43.

In operation count shaft 12 is moveably responsive to a pneumatic impulse at count pulse port 18. In response to the input pulse, piston 13 moves in a first direction (to the left in the drawing) within bore 14. This movement is partially restrained by compression spring 16, and the total movement is limited by count adjustment screw 19. Upon this movement, count pawl 20, which is slotably attached to count shaft 12, frictionally engages memory shaft 24 at the periphery of hole 23. With this engagement and with the movement of count shaft 12, memory shaft 24 is also moved in the first direction.

Figures 3, 4:
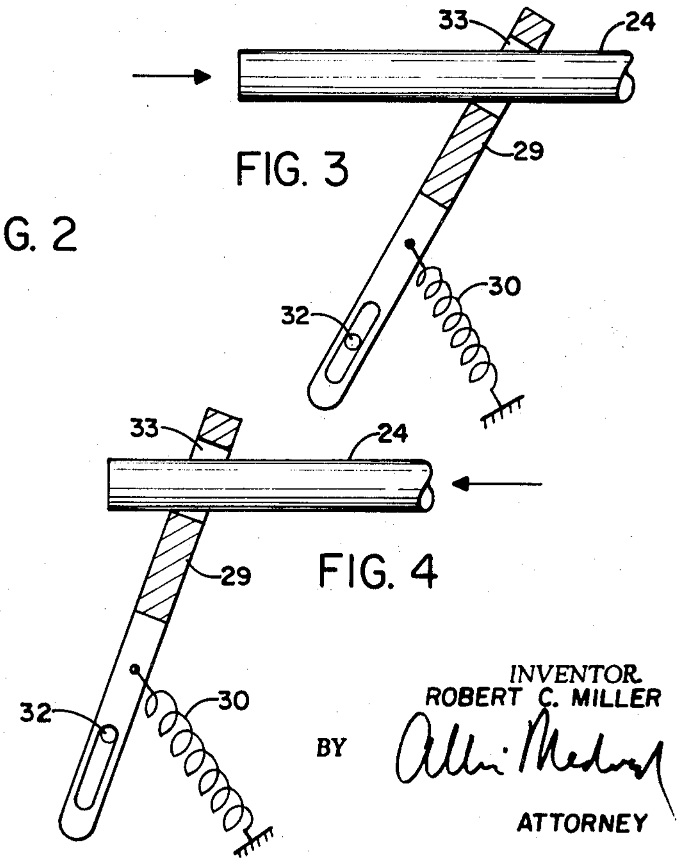
FIG. 3 is a view of a pawl and shaft.
FIG. 4 is another view of a pawl and shaft.

Retainer pawl 29 allows memory shaft 24 to move in the first direction, but prevents the shaft from moving back to its initial position as urged by compression spring 26. This action of retainer pawl 29 can be better understood by examining FIGS. 3 and 4. As shown in FIG. 3 when memory shaft 24 puts a force on pawl 29 to the right, pawl 29 will be rotated about pin 32 and move upward until the force which is placed upon it by shaft 24 is counter balanced by the force on it by pin 32 and spring 30. This action provides the retaining function. This action can be appreciated by considering a washer with a shaft through its hole. If the washer is tilted it will frictionally contact the shaft and prevent the shaft from moving within the washer hole. FIG. 4 shows retaining pawl 29 in the position it will assume when memory shaft 24 is being driven to the left by count pawl 20. When this event occurs, retaining pawl 29 rotates about boss 32 in the opposite direction and moves downward, thus allowing shaft 24 to move freely within hole 33 with a minimum of frictional engagement.

With this arrangement, as shaft 12 moves in response to an input pulse, pawl 20, which is slotably attached to shaft 12, frictionally engages shaft 24 and moves shaft 24 a predetermined distance. Shaft 24, after being moved a predetermined distance, which is effectively adjusted by the count adjustment screw 19, will be retained by retaining pawl 29. After experiencing the input pulse count, shaft 12 is urged by spring 16 back to its initial position as shown in FIG. 1. Then, when a second input pulse is received at shaft 12, its movement, once again with the aid of pawl 20, moves shaft 24 another predetermined distance. And once again, retaining pawl 29 retains the second shaft in a new position. This combination of shafts and retainers forms the pneumatic pulse counter whereby by adjusting the count adjustment screw 19, thus limiting the motion of count shaft 12, the total movement of memory shaft 24 can be limit in response to a single input. A meaningful output can be obtained from this mechanism by providing that upon a predetermined total movement of shaft 24, which movement of course would be due to the discrete number of pulses of the first shaft, control orifice 28 would thus be blocked in which event an output could be obtained at control port 27.

Reset shaft 36 is provided in order to reset memory shaft 24 to its initial position as shown in FIG. 1. Reset shaft 36 is activated by providing a pneumatic input at reset pulse port 39. A pneumatic input provides horizontal motion to piston 37 within bore 38, which movement is partially restrained by spring 41, and shaft 36 thus moves in a first direction (to the left in the drawing). This movement will cause boss 42 to make contact with pawl 29 and boss 43 to make contact with pawl 20. Further movement of reset shaft 36 in the same direction will cause both pawls to rotate to the left and to move downward, allowing memory shaft 24 to move in a second direction (to the right in the drawing), to its initial position. In order to cushion the contact of memory shaft 24 with housing 11, dashpot control screw 34 is provided to block dashpot vent 35.

The pneumatic pulse counter will find use, for instance, when specifications require that should five consecutive production units fail a particular test an entire production line must be shut down and the problem solved. For each failure in the line, a pulse would occur at count pulse port 18 which would count the pneumatic pulse counter one unit. If a second unit was defective, the counter would count a second unit. But if a satisfactory unit appeared, prior to there being five defective units, a pulse would appear at reset pulse port 39 which would operate reset shaft 36 to allow memory shaft 34 to return to its initial position and again begin counting failures.

It is to be noted that a digital readout can be provided by reading the position of the end of shaft 24.

While this invention has been described in conjunction with a specific embodiment thereof, it is evident that many alternatives, modifications, and variations will be apparent to those skilled in the art in light of the foregoing description. Accordingly, it is intended to embrace all such alternatives, modifications, and variations that fall within the spirit and scope of the claims.

I claim as my invention:

1. A resettable pneumatic pulse counter comprising:
a housing;
a moveable count shaft located within and guided by said housing, said shaft being moveably responsive in a first direction to a first type of input and spring urged in a second opposite direction;
means limiting the movement of said count shaft to a predetermined distance;
a moveable memory shaft located within and guided by said housing, said shaft being spring urged to an initial position;
a count pawl slotably engaged to said count shaft, said pawl having a hole for receiving said memory shaft, said count pawl being frictionally engaged to said memory shaft upon movement of said count shaft in said first direction thereby providing a predetermined movement of said memory shaft;

a retaining pawl slotably engaged to said housing, said pawl having a hole for receiving said memory shaft, said retaining pawl capable of allowing said memory shaft to move in a first direction in response to movement of said count pawl but providing frictional engagement with said memory shaft preventing movement in a second opposite direction;

a moveable reset shaft located within and guided by said housing, said shaft being moveably responsive to a second type input, said shaft having two bosses thereon, which bosses engage said count pawl and said retaining pawl providing a discontinuance of said frictional engagement allowing said memory shaft to return to its initial position; and means responsive to a predetermined position of said memory shaft to provide an output.

* * * * *